(12) United States Patent
Todd (10) Patent No.: US 11,326,088 B2
(45) Date of Patent: May 10, 2022

(54) LOW TEMPERATURE DIVERSION IN WELL COMPLETION OPERATIONS USING NATURAL MINERAL COMPOUND

(71) Applicant: LYONDELLBASELL ADVANCED POLYMERS INC., Houston, TX (US)

(72) Inventor: Bradley L. Todd, Duncan, OK (US)

(73) Assignee: LyondellBasell Advanced Polymers Inc., Houston, TX (US)

( * ) Notice: Subject to any disclaimer, the term of this patent is extended or adjusted under 35 U.S.C. 154(b) by 0 days.

(21) Appl. No.: 16/886,377

(22) Filed: May 28, 2020

(65) Prior Publication Data

US 2020/0385627 A1 Dec. 10, 2020

Related U.S. Application Data

(60) Provisional application No. 62/882,930, filed on Aug. 5, 2019, provisional application No. 62/858,694, filed on Jun. 7, 2019.

(51) Int. Cl.

| | |
|---|---|
| *E21B 33/138* | (2006.01) |
| *C09K 8/504* | (2006.01) |
| *E21B 43/27* | (2006.01) |
| *C04B 9/04* | (2006.01) |
| *E21B 43/26* | (2006.01) |

(52) U.S. Cl.
CPC .............. *C09K 8/5045* (2013.01); *C04B 9/04* (2013.01); *E21B 33/138* (2013.01); *E21B 43/26* (2013.01); *E21B 43/27* (2020.05)

(58) Field of Classification Search
CPC ....... C09K 8/5045; E21B 43/27; E21B 43/26; C04B 9/04
See application file for complete search history.

(56) References Cited

U.S. PATENT DOCUMENTS

| | | | | |
|---|---|---|---|---|
| 3,275,141 A | * | 9/1966 | Adams | B03D 1/06 209/166 |
| 3,785,437 A | * | 1/1974 | Clampitt | C09K 8/887 166/281 |
| 4,009,755 A | * | 3/1977 | Sandiford | C09K 8/50 166/270 |
| 5,584,926 A | * | 12/1996 | Borgholm | C04B 7/00 106/713 |
| 2007/0151726 A1 | * | 7/2007 | Crews | C09K 8/602 166/246 |
| 2011/0079061 A1 | * | 4/2011 | Sanders | C05D 1/00 71/27 |

(Continued)

OTHER PUBLICATIONS

Langbeinite, Mineral Data Publishing, 2001-2005, version 1 (Year: 2001).*

(Continued)

*Primary Examiner* — Silvana C Runyan (57) ABSTRACT

Treatment fluids for use in fluid loss control, diversion, and plugging operations and methods of use are disclosed. The treatment fluids contain a degradable particular langbeinite material that temporarily creates a physical barrier to fluid flow before degrading over time with little to no effect on the environment. This degradable additive can be combined with other traditional downhole additives such as surfactants, viscosifying agents, biocides and the like, allowing for a wide variety of applications in hydrocarbon reservoirs.

13 Claims, 4 Drawing Sheets

(56) References Cited

U.S. PATENT DOCUMENTS

2012/0138303 A1  6/2012  Welton et al.
2014/0072507 A1  3/2014  Chastain et al.
2018/0347332 A1  12/2018  Bestaoui-Spurr et al.

OTHER PUBLICATIONS

International Search Report and Written Opinion dated Sep. 4, 2020 (dated Sep. 4, 2020) for Corresponding PCT/US2020/034967.

* cited by examiner

LOW TEMPERATURE DIVERSION IN WELL COMPLETION OPERATIONS USING NATURAL MINERAL COMPOUND

PRIOR RELATED APPLICATIONS

This application is the Non-Provisional Patent Applications, which claims benefit of priority to U.S. Provisional Application No. 62/858,694, filed Jun. 7, 2019, and U.S. Provisional Application No. 62/882,930, filed Aug. 5, 2019, the contents of which are incorporated herein by reference in their entirety.

FEDERALLY SPONSORED RESEARCH STATEMENT

Not applicable.

REFERENCE TO MICROFICHE APPENDIX

Not applicable.

FIELD OF THE DISCLOSURE

The disclosure relates to treatment fluids and methods of use in hydrocarbon reservoirs, and more particularly to the use of degradable additives in treatment fluids.

BACKGROUND OF THE DISCLOSURE

Oil and gas companies are challenged to produce as much of their hydrocarbon reserves as possible in a cost-effective manner. As such, the completion and production processes often rely on the use of treatment fluids designed to resolve specific reservoir conditions through the use of one or more additives to increase hydrocarbon production.

The desired flow of the treatment fluid depends on the phase of the hydrocarbon recovery operations. During the producing (or injecting) phase of a well, it is generally desirable to have the subterranean formation as free flowing as possible or at a rate set by the design of the well. In contrast, it may be desirable to allow various fluids to flow into only a portion of the formation or wellbore while preventing flow into other portions during the drilling, completion, or workover phases. Unfortunately, the various treatment fluids may instead flow through vugs, pore spaces, and natural or manmade fractures in the formations, as well as other flow paths such as the wellbore, a well casing, perforation tunnels, slots, tubing, annuli, washouts, particulate packs, void spaces within sand and proppant packs, screens and completion, service, or workover equipment. As a result, the treatment fluids are often lost, reducing the efficiency of the treatment operation.

To overcome fluid loss, particulate material has been employed to bridge/seal/plug certain flow paths in the formations where the flow of fluids is undesirable. However, this material should temporarily block flow paths, such that these flow paths can be re-opened for subsequent operations.

Degradable materials of various types have been employed in subterranean operations for decades to temporarily block flow paths. While these materials are successful at blocking flow paths at higher reservoir temperatures, blocking at low reservoir temperatures between 75° F. and 140° F. are problematic. The lower reservoir temperatures slow or prevent the degradation process. This results in an uncertain permeability restoration because the degradation rate, if any, may be unknown at such low reservoir temperatures. This decrease in degradation at the lower temperatures leads to an increased risk of permanent blocking of the flow paths.

In addition to the uncertain degradation process, the degradable materials can also be affected by other additives such as salts, pH control additives, surfactants, breakers, biocides, crosslinkers, particulates, and the like that may be present in subsequent injection of other treatment fluids. Unexpected reactions between the un-degraded material and these other additives may lead to poisoned reservoirs, formation of insoluble impurities, or environmental damage.

As such, additional measures (i.e. added costs) are taken to remove the remaining degradable material in these reservoirs to prevent unintended reactions with subsequent treatment fluids and processes.

Despite the advances made in developing degradable materials for blocking undesirable flow paths in reservoirs, there is a continued need for the development of improved compositions that can be used at lower reservoir temperatures. Preferably, these compositions can degrade along a known rate for a given reservoir temperature and do not have undesirable reactions with other additives in the same treatment fluid or subsequently injected fluids.

SUMMARY OF THE DISCLOSURE

Described herein are treatment fluids for use in a hydrocarbon reservoir and methods of using the treatment fluids. Particularly, at least one member from the langbeinite family, in particulate form, is utilized as a degradable additive in treatment fluids used for stimulation, fluid loss control, diversion, and plugging operations. Langbeinites are a family of crystalline substances having the general formula of $M_rM'_sX_t$, wherein M is a univalent cation, M' is a divalent cation, and X is a tetrahedral anion with a double negative charge. The particulate langbeinite material can temporarily create a physical barrier to fluid flow (such as by blocking pore throats in a formation or by filling an annulus area) before slowly degrading over time to remove the physical barrier, especially at lower reservoir temperatures between about 75° F. (~23° C.) and about 140° F. (~60° C.). Thus, it can be added to a treatment fluid that is capable of carrying and placing the particulate langbeinite material at a distance from the location of the injection.

In some embodiments, the fluid has a high loading of the langbeinite material (about 20 pounds per gallon of carrier fluid) allowing it to be coated onto a downhole tool at the reservoir surface, or molded into objects such as sleeves or plugs for slotted liners and other downhole tools. Once the downhole tool is placed in the wellbore, the langbeinite-based plug or coating can degrade, opening the plug or allowing actuation of the downhole tool.

Alternatively, the fluid with a high loading can be molded for use as a ball or plug to temporarily block a passage within a conduit such as a tubing string or wellbore. Degradation and removal of the plug (or ball) is then accomplished without mechanical intervention from the well's surface. Further, there is no debris from the degraded langbeinite-based plug (or ball) to foul the reservoir or to be removed using well fluids.

In addition to the langbeinite material, the treatment fluids disclosed herein can contain other optional additives that are frequently used in treatment fluids but do not undesirably react with the langbeinite material at low reservoir temperatures. These optional additives include, but are not limited to salts, pH control additives, surfactants, breakers, biocides, crosslinkers, additional fluid loss control agents, stabilizers, chelating agents, scale inhibitors, gases, mutual solvents, particulates, binders, proppants, corrosion inhibitors, oxidizers, reducers, friction reducers, and any combination thereof. These optional additives do not affect the ability of the langbeinite to form a physical barrier, which allows the langbeinite material to be utilized in a variety of applications, in both reservoir and wellbore operations. In some applications, the additive may help with the physical blocking, as is the case with the use of additional fluid loss control agents. Thus, the langbeinite material can be added to commonly used treatment fluids to provide physical blocking capabilities without affecting the intended actions of the remaining components in the treatment fluids.

Alternatively, the treatment fluid containing the langbeinite material can be combined with acids having a pH≤3. The acids react with the langbeinite material to increase its degradation rate. This allows the langbeinite material to be used for temporary, but continuous diversion during acid treatments. Alternatively, an acid treatment fluid can be injected into the reservoir, or conduit, after the langbeinite material has been placed such that the langbeinite material soaks in the acid, allowing for the langbeinite material's premature degradation.

The present compositions and methods include any of the following embodiments in any combination(s) of one or more thereof:

A treatment fluid for treating a reservoir having a carrier fluid and a particulate langbeinite material.

A method of plugging an opening in a subterranean formation, wherein a treatment fluid comprising a carrier fluid and a particulate langbeinite material is injected into at least a portion of subterranean formation, such that the opening is plugged by the particulate langbeinite material, and degrading the particulate langbeinite material such that the opening is temporarily plugged. Further steps include flowing one or more fluids through the open that was temporarily plugged. The opening can be an annulus, casing, tubing, screens, slots, ports, a void space within sand or proppant pack, perforations, washouts, hole, and/or a parting in the casing or tubing, a natural fracture, vug, wormhole, pore throat, induced fracture, and/or formation face. Alternatively, the opening is a porous section of the subterranean formation, wherein the treatment fluid is injected at fracturing pressures to fracture the subterranean formation and the particulate langbeinite material blocks the porous section to stop fluid loss in the porous section.

A method of plugging a wellbore feature such as an annulus, casing, tubing, screens, slots, ports, a void space within sand or proppant pack, perforations, washouts, hole, a parting in the casing or tubing, wherein a treatment fluid comprising a carrier fluid and a particulate langbeinite material is injected into at least a portion of a wellbore at a wellbore feature, such that the wellbore feature is plugged by the particulate langbeinite material, and degrading the particulate langbeinite material such that the wellbore feature is temporarily plugged.

A method of temporarily plugging at least one opening in a subterranean formation such as natural fractures, vugs, wormholes, pore throats, induced fractures, or formation face. In this method, a treatment fluid comprising a carrier fluid and a particulate langbeinite material is injected into the subterranean formation. The particulate langbeinite material blocks at least one opening in the subterranean formation before degrading such that the opening is temporarily plugged.

A method of fracturing a subterranean formation with a treatment fluid comprising a carrier fluid and a particulate langbeinite material, wherein the treatment fluid is injected into the subterranean formation at fracturing pressures. The particulate langbeinite material plugs at least one porous section of the subterranean formation to stop fluid loss in the porous section degrading such that the porous section is temporarily plugged.

A method of temporarily plugging a passage within a conduit using a plug formed by a composition comprising a particulate langbeinite material, and optional particulates and/or binders. The molded plug can be placed in a conduit to temporarily plug the passage. Thereafter, the particulate langbeinite material in the molded plug can degrade such that the passage opens. Further steps include flowing one or more fluids, or transporting downhole tools, through the passage that was temporarily plugged. The passage can be within a conduit such as well casing, tubing string, downhole tool or other downhole equipment. The composition can be a fluid comprising a carrier fluid with a high loading of a particulate langbeinite material. The fluid can have about 10 to 20 pounds of particulate langbeinite material per gallon of fluid, allowing it to be molded into a plug. The plug can be any shape necessary to plug the passage.

A method of temporarily blocking at least one opening on a downhole tool using a composition comprising a particulate langbeinite material, and optional particulates and/or binders. The composition can be molded into a sleeve for placement over at least one opening, a plug shaped to fit into the opening, or the composition can be coated onto the tool to form a harden shell over the opening. Once at least one opening is blocked by the composition, the downhole tool can be run into a wellbore. Thereafter, the particulate langbeinite material in the molded sleeve, plug, and/or coating can degrade such that at least one opening opens. Further steps include flowing one or more fluids through at least one opening that was temporarily blocked. The composition can be a fluid comprising a carrier fluid with a high loading of a particulate langbeinite material. The fluid can have about 10 to 20 pounds of particulate langbeinite material per gallon of fluid, allowing it to be molded into a plug of any shape or a sleeve of any length, width, or thickness. Alternatively, the high loading of the particulate langbeinite material allows it to form a thick coating (about 0.5 to 5 inches thick) onto the tool to temporarily block at least one opening.

Any of the above methods further comprising flowing one or more fluids through the opening that was temporarily plugged.

Any of the above methods further selectively degrading the particulate langbeinite material by injecting an acid treatment fluid into the subterranean formation.

Any of the above methods or compositions, wherein the treatment fluid is used in reservoirs with a bottom hole temperature between 75° F. (~23° C.) and 140° F. (~60° C.).

Any of the above methods or compositions, wherein the pH of said treatment fluid is seven or less.

Any of the above methods or compositions, further comprising an acid, a starch, a surfactant, a guar polymer, a crosslinker, a friction reducer, a corrosion inhibitor, xylene, or any combination thereof, in the treatment fluid.

Any of the above methods or compositions, wherein the treatment fluid further comprises at least one additive selected from a group comprising salts, viscosifying agents, pH control additives, surfactants, breakers, biocides, crosslinkers, additional fluid loss control agents, stabilizers, chelating agents, scale inhibitors, gases, mutual solvents, particulates, corrosion inhibitors, oxidizers, reducers, friction reducers, and any combination thereof.

Any of the above methods or compositions, wherein the particle size of the particulate langbeinite material is from about 4 mesh to about 150 mesh on the U.S. Sieve Series scale.

Any of the above methods or compositions, wherein the particle size of the particulate langbeinite material is from about 5 microns to about 4 mesh (on the U.S. Sieve Series scale), or 5 to 50 microns on the U.S. Sieve Series scale.

Any of the above methods or compositions, wherein the carrier fluid is brine, the particulate langbeinite material has a particle size of about 4 mesh (on the U.S. Sieve Series scale) to about 5 microns, and the pH of the treatment fluid is 6.

Any of the above methods or compositions, wherein the carrier fluid is brine, the particulate langbeinite material has a particle size of about 12-14 mesh (on the U.S. Sieve Series scale), and the pH of the treatment fluid is 6.

Any of the above methods or compositions, wherein the carrier fluid is seawater, the particulate langbeinite material has a particle size of about 4 mesh (on the U.S. Sieve Series scale) to about 5 microns, and the pH of the treatment fluid is 6.

Any of the above methods or compositions, wherein the carrier fluid is seawater, the particulate langbeinite material has a particle size of about 12-14 mesh (on the U.S. Sieve Series scale), and the pH of the treatment fluid is 6.

Any of the above methods or compositions, wherein the carrier fluid is a salt water with a NaCl concentration between about 2.5 to about 15%, the particulate langbeinite material has a particle size of about 4 mesh (on the U.S. Sieve Series scale) to about 5 microns, and the pH of the treatment fluid is 6.

Any of the above methods or compositions, wherein the carrier fluid is a salt water with a NaCl concentration between about 2.5 to about 15%, the particulate langbeinite material has a particle size of about 12-14 mesh (on the U.S. Sieve Series scale), and the pH of the treatment fluid is 6.

Any of the above methods or compositions, wherein the carrier fluid is a neutral pH, fresh water solution, and the degree of degradation for a given temperature in ° F. (T) and time in hours (t) can be calculated as follows:

$$\% \text{ Degradation} = 100 * e^{(-t*(0.000004867T^3 - 0.0013388597T^2 + 0.130546917T - 4.027318772))}$$

Any of the above methods or compositions, wherein the particulate langbeinite material is present in an amount between about 50 pounds per thousand gallons ("pptg") of the carrier fluid and about 400 pptg of the carrier fluid.

Any of the above methods or compositions, wherein the particulate langbeinite material is present in an amount that is less than 20 pounds per gallons of the carrier fluid.

Any of the above methods or compositions, wherein the treatment fluid is used for stimulation, fluid loss control, diversion, and plugging operations.

Any of the above methods or compositions, wherein the particulate langbeinite material is langbeinite.

Any of the above methods or compositions, wherein the particulate langbeinite material is $K_2Mg_2(SO_4)_3$, $K_2Ca_2(SO_4)_3$, $K_2Mn_2(SO_4)_3$, $(NH_4)_2Mg_2(SO_4)_3$, $K_2Mn_2(BeF_4)_3$, $K_2Mg_2(BeF_4)_3$, $K_2Zn_2(BeF_4)_3$, $(NH_4)_2Mg_2(BeF_4)_3$, $(NH_4)_2Mn_2(BeF_4)_3$, $Cs_2Ca_2(BeF_4)_3$, $Cs_2Mn_2(BeF_4)_3$, $(NH_4)_2Mn_2(SeO_4)_3$, $Cs_2Mn_2(CrO_4)_3$, or any combination thereof.

Any of the above methods, wherein the treatment fluid is alternately injected with an acid treatment fluid.

A method of using any of the above compositions for stimulation, fluid loss control, diversion, and plugging operations comprising injecting the composition(s) into a subterranean formation with a bottom hole temperature between 75° F. (~23° C.) and 140° F. (~60° C.) and blocking at least one opening in the subterranean formation with the particulate langbeinite material. The particulate langbeinite material can then be allowed to degrade naturally or selectively degraded by injection an acidic fluid. Once degraded, fluid can be flowed through the at least one opening that was temporarily blocked. The particulate langbeinite material can be $K_2Mg_2(SO_4)_3$, $K_2Ca_2(SO_4)_3$, $K_2Mn_2(SO_4)_3$, $(NH_4)_2Mg_2(SO_4)_3$, $K_2Mn_2(BeF_4)_3$, $K_2Mg_2(BeF_4)_3$, $K_2Zn_2(BeF_4)_3$, $(NH_4)_2Mg_2(BeF_4)_3$, $(NH_4)_2Mn_2(BeF_4)_3$, $Cs_2Ca_2(BeF_4)_3$, $Cs_2Mn_2(BeF_4)_3$, $(NH_4)_2Mn_2(SeO_4)_3$, $Cs_2Mn_2(CrO_4)_3$, or any combination thereof.

Definitions

The terms "langbeinite material" and "langbeinites" are used interchangeably to refer to the langbeinite family, which is a family of crystalline substances with a cubic structure, a small and large cation, and a tetrahedral anion with a double negative charge having the general formula of $M_pM'_qX_r$, wherein M is a univalent cation, M' is a divalent cation, and X is a tetrahedral anion with a double negative charge. These terms should not be limited to the specific langbeinite material that is a potassium magnesium sulfate mineral with the chemical formula of $K_2Mg_2(SO_4)_3$, although $K_2Mg_2(SO_4)_3$ is included within the terms. Further examples of langbeinites include, inter alia, $K_2Mg_2(SO_4)_3$, $K_2Ca_2(SO_4)_3$, $K_2Mn_2(SO_4)_3$, $(NH_4)_2Mg_2(SO_4)_3$, $K_2Mn_2(BeF_4)_1$, $K_2Mg_2(BeF_4)_3$, $K_2Zn_2(BeF_4)_3$, $(NH_4)_2Mg_2(BeF_4)_3$, $(NH_4)_2Mn_2(BeF_4)_3$, $Cs_2Ca_2(BeF_4)_3$, $Cs_2Mn_2(BeF_4)_3$, $(NH_4)_2Mn_2(SeO_4)_3$, and $Cs_2Mn_2(CrO_4)_3$.

As used herein, the term "treatment," or "treating," is intended to refer to any wellbore or subterranean operation that uses a fluid in conjunction with a desired function and/or for a desired purpose. The term "treatment," or "treating," is not intended to imply any particular action by the fluid or its components. Exemplary treatment fluids include, but are not limited to acidizing fluids, fracturing fluids, gravel packing fluids, drilling or milling fluids, lost circulation fluids, solvent fluids, chemical stimulation fluids, workover fluids, completion fluids, injection fluids, cleanout fluids, perforating fluids and kill fluids.

As used herein, the term "fluid loss" refers to the undesirable migration or loss of fluids and/or slurry into a subterranean formation and/or a void space within the proppant pack.

As used herein, the term "design temperature" refers to an estimate or measurement of the actual temperature at the down hole environment at the time of the treatment. That is, design temperature takes into account not only the bottom hole static temperature ("BHST"), but also the effect of the temperature of the treatment fluid on the BHST during treatment. Because treatment fluids may be considerably cooler than BHST, the difference between the two temperatures can be quite large.

As used herein, the term "reservoir temperature" refers to the bottom hole temperature of the reservoir. "Low reservoir temperature" are reservoir temperatures at or below about 140° F. (~60° C.).

The terms "hydraulic fracturing" and "fracking" are used interchangeably to refer to a well stimulation technique in which rock is fractured by a pressurized treatment fluid called a "fracturing fluid". When the hydraulic pressure is removed from the well, small grains of hydraulic fracturing proppants (for example sand or aluminum oxide) hold the fractures open. The fracturing pressure of the treatment fluid is extremely high, up to 15,000 pounds per square inch, while the injection rate can be about 265 liters per second.

The term "acid treatment" is used to refer to a well stimulation technique in which acid treatment fluids are injected into a reservoir to dissolve reservoir rock or sediments, mud solids, and/or other soluble damage between the sediment grains of the reservoir rocks or flow paths. This treatment allows for the restoration of the natural productivity of the reservoir rock.

The terms "carrier fluid" and "base fluid" are used interchangeably to refer to a fluid that is used to transport materials into or out of the wellbore As used herein, the term "derivative" refers to a compound that is derived from a similar compound by a chemical reaction. The derived compound can be made by, for example, replacing one atom in the similar compound with another atom or group of atoms, rearranging two or more atoms in the similar compound, ionizing the similar compound, or creating a salt of the similar compound.

All concentrations herein are by weight percent ("wt %") unless otherwise specified.

As used herein, the term "foamed" refers to fluids that are mixed with a gas or commingled fluids.

As used herein, the terms "starch" or "starches" refers to polysaccharide gum. Starch is a fluid loss control agent, but may also increase the viscosity of the carrier fluid if present in a large enough amount.

The use of the word "along" or "alongside" means extending in a more or less constant direction in relation to something else, such as a wellbore or fracture face.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| BHST | bottom hole static temperature |
| pptg | pounds per thousand gallons |
| ppg | pounds per gallon |
| lbs | pound |

DESCRIPTION OF EMBODIMENTS OF THE DISCLOSURE

The present disclosure provides novel treatment fluid compositions that utilize a particulate langbeinite material, and methods of use. Langbeinite material is a family of crystalline substances with a cubic structure, a small and large cation, and a tetrahedral anion with a double negative charge. In particulate form, the langbeinite material can form temporary physical barriers in reservoir, particularly in reservoirs with a bottom hole temperature between 75° F. (~23° C.) and 140° F. (~60° C.). After some time, the langbeinite material degrades naturally, thus removing the physical barrier. Alternatively, the langbeinite material can be removed before fully degrading by soaking with an acidic treatment fluid (pH≤3). This allows for an operator to controllably block certain porous rock and openings, or other areas in a reservoir or downhole tool for a temporary period of time, without having a permanent blockage. Methods of using the langbeinite material in various treatment fluid compositions are also disclosed.

In more detail, langbeinites are a family of crystalline substances having the general formula of $M_rM'_sX_t$, wherein M is a univalent cation, M' is a divalent cation, and X is a tetrahedral anion with a double negative charge. The presently described treatment fluid compositions use langbeinite materials that are safe for the environment, as well as being soluble at reservoir temperatures at or below 140° F. (~60° C.). As such, the langbeinite material used in the present compositions and methods have a large univalent cation (M) that is selected from a group comprising potassium, cesium, and/or ammonium; a small divalent cation (M') that can be selected from a group comprising magnesium, calcium, manganese, iron, and/or zinc; and a tetrahedral anion with a double negative charge (X) that can be selected from a group comprising sulfate ($SO_4^{2-}$), tetrafluoroberyllate ($BeF_4^{2-}$), selenate ($SeO_4^{2-}$), and chromate ($CrO_4^{2-}$).

Exemplary langbeinite material include, but are not limited to, $K_2Mg_2(SO_4)_3$, $K_2Ca_2(SO_4)_3$, $K_2Mn_2(SO_4)_3$, $(NH_4)_2Mg_2(SO_4)_3$, $K_2Mn_2(BeF_4)_3$, $K_2Mg_2(BeF_4)_3$, $K_2Zn_2(BeF_4)_3$, $(NH_4)2Mg2(BeF_4)_3$, $(NH_4)_2Mn_2(BeF_4)_3$, $Cs_2Ca_2(BeF_4)_3$, $Cs_2Mn_2(BeF_4)_3$, $(NH_4)_2Mn_2(SeO_4)_3$, and $Cs_2Mn_2(CrO_4)_3$. In some embodiments, the langbeinite material is langbeinite. Langbeinite has a chemical formula of $K_2Mg_2(SO_4)_3$, a Mohs hardness of 3.5 to 4 and a specific gravity of about 2.83. Langbeinite is an inexpensive and readily available material that can reduce the costs of various wellbore and reservoir treatments.

The novel treatment fluid compositions comprise a carrier fluid and a particulate langbeinite material, and other optional additives. In some embodiments, the treatment fluid composition is injected into a wellbore penetrating a formation, wherein the carrier fluid carries the particulate langbeinite material a distance from the location of the injection. The treatment fluid dissipates into the subterranean zone through openings or porous locations in the reservoir rock, which may be naturally occurring (cracks, fractures, and fissures) or man-made such as an annulus between nested pipes or between a wellbore and a pipe (wellbores, perforations, and fractures). As the treatment fluid is placed in the reservoir, the particulate langbeinite material is screened out of the treatment fluid by the formation, or annulus, allowing it to be packed into the openings based on the selected size of particulate langbeinite material. The packed particulate langbeinite material can then be used as a fluid loss control agent, diverting agent, or plugging agent, directing additionally injected fluids to other areas of the reservoir or annulus.

The methods disclosed herein use the particulate langbeinite material in many different types of treatment fluids for a variety of subterranean treatment operations including stimulation, fluid loss control, lost circulation, diversion, and plugging operations.

Alternatively, the composition can have a high loading of particulate langbeinite material allowing it to be molded into sleeves or other coverings to temporarily block openings in downhole tools, or molded into plugs for blocking passages in conduits. In yet another alternative, the composition can be coated onto the downhole tool. A suitable coating may be between 0.5 and 5 inches in thickness, or between 1 and 3 inches in thickness.

When fluid loss control is desired, the novel treatment fluid compositions can be used in methods for fracturing operations, acidizing operations, scale inhibiting operations, water blocking operations, clay stabilizer operations, biocide operations, fracturing operations, frac-packing operations, and gravel packing operations because fluid loss is problematic for these operations.

In fracturing operations, for example, fluid loss into the formation may result in a reduction in fluid efficiency, such that the fracturing fluid cannot propagate the fracture as desired. As such, fluid loss control materials are added to fracturing fluid to lower the volume of a filtrate that passes through a filter medium. That is, the fluid loss control materials block the pore throats and spaces that otherwise allow a treatment fluid to leak out of a desired zone and into an undesired zone. In the present methods, the particulate langbeinite material can be used as a fluid loss control material in subterranean treatment fluids to fill/bridge the pore spaces in a formation matrix and/or proppant pack, or to contact the surface of a formation face and/or proppant pack, thereby forming a type of filter cake that blocks the pore spaces in the formation or proppant pack, and prevents fluid loss therein. The treatment fluid containing the langbeinite material can be alternated with a fracturing fluid in an interval design such that a first area of a formation is fractured and plugged, before subsequent fracturing treatment fluid is injected.

In some embodiments, the novel treatment fluid compositions are fracturing fluids and the particulate langbeinite material is used as a fluid loss control agent. When used during the fracturing operation, this novel treatment fluid composition is injected at a pressure/rate sufficient to create or extend at least one fracture in that portion of the subterranean formation, wherein the carrier fluid places the particulate langbeinite material into a portion of the fractured reservoir. The particulate langbeinite material is then able to provide fluid loss control alongside the fracture faces.

For methods for diverting fluids, a treatment fluid having a diverting material is used to seal off a portion of the subterranean formation. The methods disclosed herein inject the novel treatment fluid compositions into the formation wherein the particulate langbeinite material is the diverting material used to seal off a portion of the formation. The particulate langbeinite material fills the largest pores, fissures, or vugs, until that portion of the formation is bridged and sealed. This allows for a second fluid to be diverted from the now sealed, highly permeable portions of the formation into the less permeable portions of the formation, or new zones, that require treatment. The steps of placing the particulate langbeinite material and injecting a second fluid may be repeated until the desired number of stages of treating fluid has been pumped.

For methods for plugging operations, the particulate langbeinite material in the novel treatment fluid compositions is used as a plugging agent to seal off a wellbore, providing zonal isolation. For this method, the novel treatment fluid composition is injected such that the particulate langbeinite material seals the wellbore face to prevent fluids from entering the permeable zones until the plugging agent (particulate langbeinite material) degrades or is removed. In some embodiments of the methods for plugging operations, it may be necessary to use the particulate langbeinite material to completely fill a portion of an annulus along a wellbore.

Figure 1A:
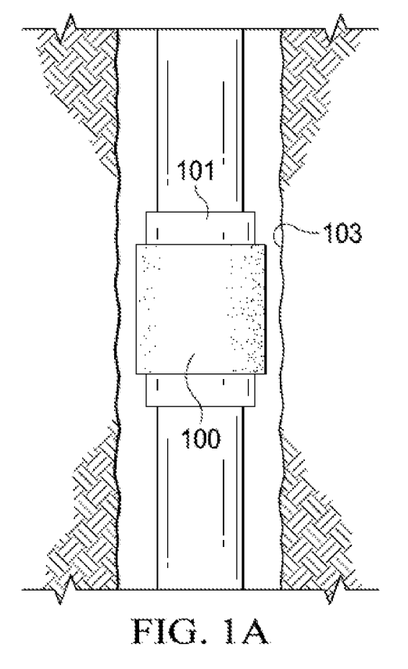
FIG. 1A-B. A downhole tool having a sleeve molded from a langbeinite-based fluid (FIG. 1A) and the downhole tool after the langbeinite has degraded (FIG. 1B).
Figure 1B:
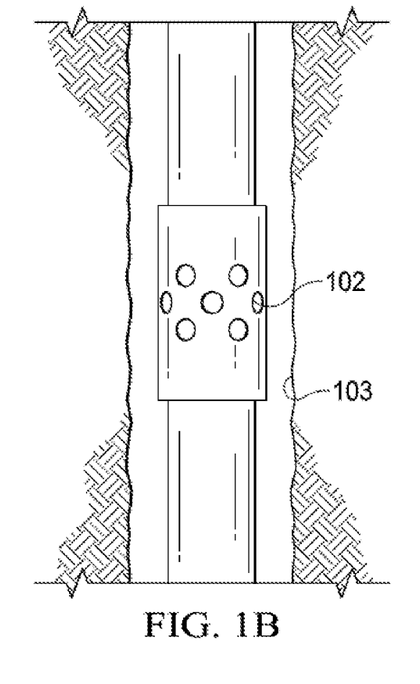

In other embodiments, the particulate langbeinite material is present in a high loading of about 10 to about 20 pounds per gallon of carrier fluid, allowing it to be molded as sleeves or other coverings for blocking openings in downhole tools, or as plugs for downhole tools or passages. FIG. 1A displays one such embodiment, wherein the particulate langbeinite material was used to form a sleeve (100) to cover and block openings (102) in a downhole tool (101). Once the tool is deployed into a wellbore (103), the particulate langbeinite material can degrade such that it is no longer blocking the openings (102), as shown in FIG. 1B, allowing fluid or other material to flow therethrough. Though not shown in FIG. 1A, the particulate langbeinite material can also be coated onto the downhole tool (101) to cover and block the openings.

Figure 2A:
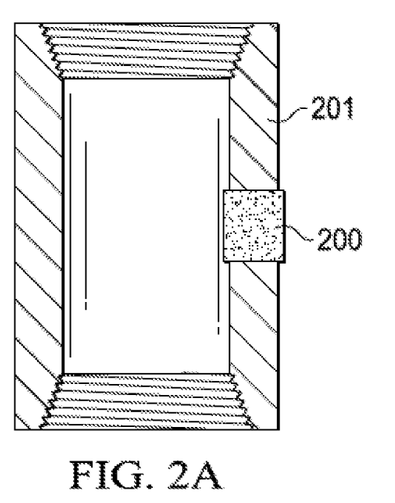
FIG. 2A-B. A downhole tool having a plug molded from a langbeinite-based fluid to block an opening in the downhole tool (FIG. 2A) and the downhole tool after the langbeinite plug has degraded (FIG. 2B).
Figure 2B:
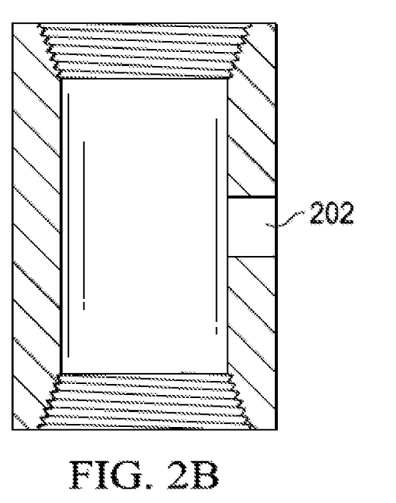

FIG. 2A displays an alternative embodiment of a plug (200) molded from a composition comprising the particulate langbeinite material. The shape and size of the plug can be modified to fix the contours of the port or other opening. The plug is placed in a port and/or other opening in the downhole tool or other equipment (201) on the surface before it is deployed into the wellbore (not shown). After being deployed, the langbeinite-based plug can degraded, opening up the port (202) and allowing flow.

Figure 3:
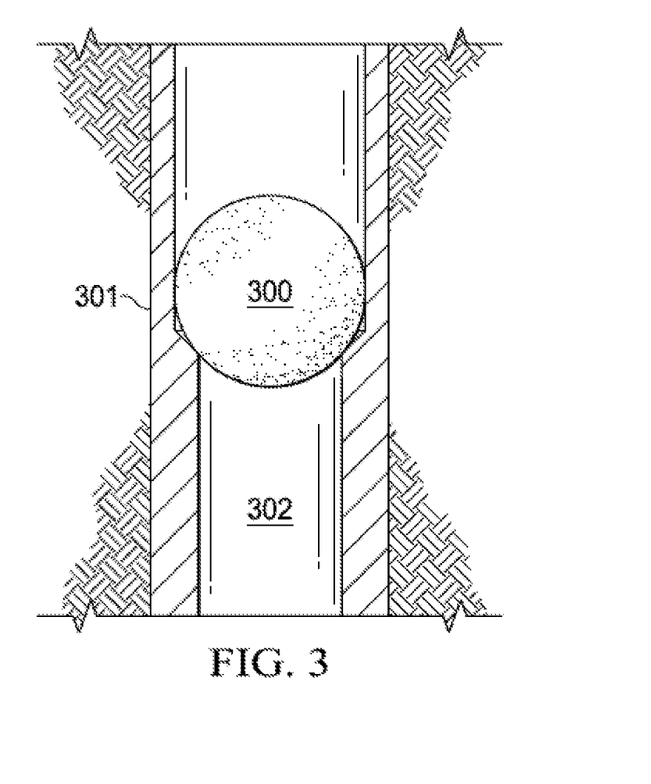
FIG. 3. A degradable ball formed from a langbeinite-based fluid for temporarily plugging an opening.

FIG. 3 displays a ball molded from a composition comprising the particulate langbeinite material. The ball (300) can be placed in a conduit or other passage (302) to temporarily block the opening. The passage (302) can be within a conduit in a downhole tool or other equipment, or can be placed in a well casing or tubing string. Such balls are common in multiple well operations, including operations for actuating a tool or blocking flow. Though the ball (300) is shown as being spherical in FIG. 3, the ball can be molded into any shape needed to block the opening.

For the novel compositions described herein, the treatment fluid has a carrier fluid, also known as a base fluid, that may be aqueous, non-aqueous, foamed, or an emulsion. This includes, but is not limited to, fresh water, salt water, brine (saturated salt water), seawater, produced water (subterranean formation water brought to the surface), surface water (such as lake or river water), and flow back water (water placed into a subterranean reservoir and then brought back to the surface). In some embodiments, the carrier fluid is selected from a group comprising fresh water, salt water, brine, and seawater. The salt water can have a NaCl concentration between about 2.5 wt % and about 15 wt %. In other embodiments, the carrier fluid is brine.

A foamed carrier fluid may be desirable in certain methods to reduce the amount of fluid that is needed in a water sensitive subterranean formation, to reduce fluid loss in the formation, and/or to provide enhanced proppant suspension. For the novel treatment fluid compositions foamed with a gas, any gas may be used, including nitrogen, carbon dioxide, air, or methane. The gas may be present in the range of from about 5% to about 98% by volume of the treatment fluid, or, alternatively, in the range of from about 20% to about 80% by volume of the treatment fluid. The amount of gas to incorporate in the fluid may be determined by many factors including the viscosity of the fluid and the bottom hole pressures involved in a particular application. However, one of ordinary skill in the art will be able to select how much gas, if any, to incorporate into foamed treatment fluids of the present composition for select operations.

In other embodiments, the novel treatment fluid compositions can be an aqueous acid solution, such as when the treatment fluid is also acting as an acidizing fluid. The aqueous acid solution can include one or more acids such as hydrochloric acid, acetic acid, formic acid and other organic acids, such that the pH of the treatment fluid is low, about 3 or less.

In yet other embodiments, the novel treatment fluid compositions are viscous, especially when using large particulate langbeinite material. For a fracturing operation, a frac-packing operation, a gravel packing operation, or some other operation used to either place particulates or stimulate the formation, a viscous treatment fluid has to carry the large particulate langbeinite material to its appropriate location. Thus, the novel treatment fluid compositions may further comprise viscosifying agents, and optional crosslinkers.

Selection of the particulate langbeinite material for the novel treatment fluid composition for a desired use depends on a number of factors including (1) the particle size of the langbeinite material, (2) the loading of langbeinite material in the treatment fluid, (3) the pH of the treatment fluid, and (4) the design temperature. Factors 1 and 2 are directed to features of the particulate langbeinite material that allow it to plug openings, and Factors 3 and 4 are directed to the solubility of the particulate langbeinite material Particle size affects the selection of the particulate langbeinite material. The particulate langbeinite material is screened out of the treatment fluid by the formation whereby it is packed into the openings. Thus, the particle size of the material should be selected based on the estimated sizes of the openings to be packed.

The particle size of the particulate langbeinite material used in the present compositions may be in the range of from about 4 mesh on the U.S. Sieve Series Scale to about 150 mesh on the U.S. Sieve Series Scale, with the selected size(s) being dependent on the application. Alternatively, the particle size of the particulate langbeinite material can be between 5 microns and 50 microns, or between 4 mesh (on the U.S. Sieve Series Scale) and 5 microns. For near-wellbore bridging and plugging fractures, the particles may be a distribution of particles ranging from about 4 mesh to about 5 microns. In contrast, the langbeinite material particle size for fluid loss application in fracturing may range from about 100 mesh to about 5 microns. For far-field diverting treatment methods, the particles may be in the range of from about 60 mesh to about 5 microns. Treatment methods for sealing on gravel or proppant packs may utilize langbeinite material with a particle size between about 50 mesh to 5 microns, whereas the size of the langbeinite material for plugging screens may be from about 12 mesh to 5 microns. Even larger langbeinite material particles may be needed for plugging slots, ports or perforations, and may need to be as big as 1 inch.

The novel treatment fluid compositions can have particulate langbeinite material that is one particle size, or a combination of two or more particle sizes. In some embodiments, the novel treatment fluid compositions use a mixture of two or more particle sizes of the particulate langbeinite material to achieve fluid loss or diversion control, such as a 12/14 mesh mixture or a distribution of sizes between 5 to 50 microns.

Loading of langbeinite material in the treatment fluid affects the selection of the particulate langbeinite material. As the particulate langbeinite material is being used as a fluid loss control agent, a diverting agent, or a plugging agent, the loading amounts will depend on the application. For methods disclosed here for plugging operations, large quantities of the particulate langbeinite material will be needed to completely close a flow path rather than simply block pore throats or rock faces, as needed in diversion or fluid loss control methods. One of ordinary skill in the art will be able to select the appropriate amount of loading of the particulate langbeinite material to include in the novel treatment fluid composition based on, among other things, the application of the treatment fluid.

In some embodiments, the particulate langbeinite material may be included in the treatment fluid having an unfoamed carrier fluid in an amount as low as about 10 pounds per thousand gallons ("pptg") or as high as about 20 pounds per gallon ("ppg") of the carrier fluid. Alternatively, the particulate langbeinite material can be included in an unfoamed carrier fluid in an amount from about 10 to about 500 pptg, or 50 pptg to about 400 pptg, or about 100 pptg to about 300 pptg, or about 10 pptg to about 100 pptg, or about 10 pptg to about 50 pptg, or about 200 pptg to about 400 pptg, or about 50 to about 150 pptg. This relatively high loading of the particulate langbeinite material allows for a sufficient quantity to act to plug a space, control fluid loss, or divert fluids as desired. Foamed carrier fluids will have reduced carrying capacity based, at least in part, on the density of the foam.

The pH of the treatment fluid affects the selection of the particulate langbeinite material. To allow for relatively slow solubility (i.e. degradation) of the particulate langbeinite material, the novel treatment fluid compositions have a pH that is neutral or below (pH≤7). In some embodiments, such as when the treatment fluid is also acting as an acidizing fluid, the pH may be very low (pH≤3). Alternatively, the pH of the treatment fluid will be between about 4 to about 7, or between 0 to about 3, or between about 3 to about 5.

A benefit of the lower pH is the decrease in the formation of magnesium hydroxide ($Mg(OH)_2$) from degraded langbeinite material having magnesium. $Mg(OH)_2$ is insoluble and could damage the reservoir, thus its formation is avoided by using the lower pH.

The design temperature affects the selection of the particulate langbeinite material.

The design temperature affects the solubility of the particulate langbeinite material and can be used to estimate the amount of time the particulate langbeinite material will block an opening before degrading. At optimal pH and loading, the particulate langbeinite material is capable of physically blocking an opening for about 3 to 14 hours at reservoir temperatures of 75° F. (~23° C.) to about 140° F. (~60° C.). At temperatures lower than about 75° F. (~23° C.), the degradation rate decreases, allowing for the blockage to be extended. At temperatures above 140° F. (~60° C.), the degradation rate increases, reducing the amount of time the particulate langbeinite material will be able to block the opening. As the temperature increases (>125° F. (~52° C.)) and pH decreases (≤3), the degradation rate of the particulate langbeinite material increases, reducing the amount of time that the particulate langbeinite material can block openings. As such, the particulate langbeinite material may need to be combined with a higher pH (i.e. 3<pH≤7) carrier fluid and injected in stages with the lower pH fluid.

In some embodiments, the novel treatment fluid compositions are injected into reservoirs that have a design temperature of between about 75° F. (~23° C.) to about 140° F. (~60° C.), or between about 75° F. (~23° C.) to about 100° F. (~38° C.), or between about 110° F. (~43° C.) to about 140° F. (~60° C.), or between about 95° F. (35° C.) to about 125° F. (~52° C.).

Regardless of the application, the total time needed for the particulate langbeinite materials to degrade and dissolve in a fluid in a low temperature reservoir is in the range of from about 3 hours to about 14 hours depending upon the temperature of the subterranean zone in which it is placed. However, some variation in the degradation rate will occur depending upon the particle size and other additives that may be present in the treatment fluid.

For embodiments requiring a known blocking time, the particulate langbeinite material can be removed before it degrades by soaking the material in an acidic solution (pH≤3). This acidic solution increases the degradation rate of the particulate langbeinite material.

Depending on the application of the treatment fluid containing langbeinite material, additional additives can be included in the carrier fluid to address other needs of the reservoir or wellbore without affecting the ability of the langbeinite to block openings.

In some embodiments, the additional additives aid the langbeinite material in controlling fluid loss, diversion, or plugging. Alternatively, the additional additives are directed to other actions besides controlling fluid loss, diversion, or plugging. As such, the treatment fluids can further comprise optional additive including, but not limited to salts, pH control additives, surfactants, breakers, biocides, crosslinkers, additional fluid loss control agents, stabilizers, chelating agents, scale inhibitors, gases, mutual solvents, particulates, corrosion inhibitors, oxidizers, reducers, friction reducers, and any combination thereof.

In more detail, the novel treatment fluid compositions using particulate langbeinite material can be combined with optional additives such as:

Viscosifying Agents and Crosslinkers.

Particularly in fracturing and gravel packing operations, it may be desirable to add a viscosifying agent to the treatment fluids described here. The viscosifying agents may comprise any substance (for example, a polymeric material) capable of increasing the viscosity of the treatment fluids. In certain embodiments, the viscosifying agent may comprise one or more polymers that are capable of forming a crosslink in a crosslinking reaction in the presence of a crosslinking agent, and/or polymers that have at least two molecules that are crosslinked (i.e., a crosslinked viscosifying agent). The viscosifying agents may be biopolymers, polysaccharides, and/or derivatives thereof that contain one or more of these monosaccharide units: galactose, mannose, glucose, xylose, arabinose, fructose, glucuronic acid, or pyranosyl sulfate. Examples of viscosifying agents for the present methods and compositions include, but are not limited to, cellulose derivatives, carboxymethylguars, carboxymethylhydroxyethylguars, carboxymethylhydroxypropylguars, hydroxyethylcelluloses, carboxyethylcelluloses, carboxymethylcelluloses, carboxymethylhydroxyethylcelluloses, diutan gums, xanthan gums, galactomannans, hydroxyethylguars, hydroxypropylguars, scleroglucans, wellans, starches, and any derivative and combination thereof.

The viscosifying agent may be present in an amount sufficient to provide the desired viscosity. In some embodiments, the viscosifying agents may be present in an amount in the range of from about 0.01% to about 10% by weight of the treatment fluid. In other embodiments, the viscosifying agents may be cellulose derivatives present in an amount in the range of from about 0.1% to about 1% by weight of the treatment fluid. In other embodiments, the viscosifying agents may be starches present in the range of from about 3% to 5% by weight of the treatment fluid or from about 5 to 10 lbs pptg of the carrier fluid. In other embodiments, the viscosifying agents may be guars present in the range of from about 10 to 50 lbs pptg of the treatment fluid or from about 10 to 25 lbs pptg of the carrier fluid or from about 30 to 50 lbs pptg of the carrier fluid or 30 lbs pptg of the carrier fluid. In other embodiments, the viscosifying agents may be polysaccharides present from about 0.1% to 3% by weight of the treatment fluid. In some embodiments the viscosifying agent may be a mixture of a polysaccharide and a starch.

In those embodiments of the treatment fluid where it is desirable to crosslink the viscosifying agent, the treatment fluid may comprise one or more crosslinking agents. The crosslinking agents may comprise a metal ion or similar component that is capable of crosslinking at least two molecules of the viscosifying agent. Examples of crosslinking agents include, but are not limited to, magnesium ions, zirconium ions, titanium ions, aluminum ions, antimony ions, chromium ions, iron ions, copper ions, magnesium ions, and zinc ions. These ions may be provided by any compound that is capable of producing one or more of these ions as is well understood by those of skill in the art. Examples of such compounds include, but are not limited to, ferric chloride, magnesium oxide, zirconium lactate, zirconium triethanolamine, zirconium lactate triethanolamine, zirconium carbonate, zirconium acetylacetonate, zirconium malate, zirconium citrate, zirconium diisopropylamine lactate, zirconium glycolate, zirconium acetate lactate, zirconium triethanolamine glycolate, zirconium lactate glycolate, zirconium triisopropanolamine lactate, titanium lactate, titanium malate, titanium citrate, titanium ammonium lactate, titanium triethanolamine, and titanium acetylacetonate, aluminum lactate, aluminum citrate, aluminum acetate, antimony compounds, chromium(III) compounds, iron(II) compounds, iron(III) compounds, copper compounds, zinc compounds, and combinations thereof. In certain embodiments, the crosslinking agent may be formulated to remain inactive until it is "activated" by, among other things, certain conditions in the fluid (for example, pH, temperature, etc.) and/or interaction with some other substance. In alternative embodiments, a crosslinking agent may be used wherein the ion-containing compounds is selected from the group consisting of ammonium zirconium carbonate, zirconium citrate, zirconium lactate citrate, zirconium oxide, titanium dioxide, aluminum nicotinate, aluminum sulfate, aluminum sodium sulfate, aluminum ammonium sulfate, chromium caseinate, chromium potassium sulfate, zinc sulfate, zinc hydrosulfite, magnesium chloride, magnesium sulfate, magnesium gulconate, copper sulfate, and copper gulconate.

Crosslinking agents may be present in the treatment fluids in an amount sufficient to provide a desired degree of crosslinking between molecules of the viscosifying agent. In certain embodiments, the crosslinking agent may be present in an amount in the range of from about 0.005% to about 1% by weight of the treatment fluid. Alternatively, the crosslinking agent may be present in an amount in the range of from about 0.05% to about 0.1% by weight of the first treatment fluid and/or second treatment fluid.

While crosslinking agents may be added in a concentrated solution, the numerical ranges given above refer to the percentage of metal ions by weight of the treatment fluid. One of ordinary skill in the art will be able to select the appropriate amount of crosslinking agent to include in a treatment fluid based on, among other things, the temperature conditions of a particular application, the type of viscosifying agents used, the molecular weight of the viscosifying agents, the desired degree of viscosification, and/or the pH of the treatment fluid.

It takes greater horsepower to pump fluids that are more viscous, especially when trying to place the fluids at substantial distances from the injection location. Thus, a delay in the crosslinking of the treatment fluids until the fluid is close to the area to be treated may be needed. Such delay allows the operator to pump a non-crosslinked (and thus less viscous) fluid over a longer distance before having to add horsepower to place the more viscous, crosslinked fluid. One skilled in the art will be familiar with known methods to delay crosslinking, such as encapsulation, chemical delays (for example chelating agents), etc. In some embodiments, the activation of the crosslinking agent may be delayed by encapsulation with a coating (for example, a porous coating through which the crosslinking agent may diffuse slowly or a degradable coating that degrades down hole) that delays the release of the crosslinking agent until a desired time or place.

Particulates. The novel treatment fluids described herein may further comprise additional optional particulates, including proppant particulates or gravel particulates. Such particulates may be included in the treatment fluids when, for example, a gravel pack is to be formed in at least a portion of the wellbore, or a proppant pack is to be formed in one or more fractures in the subterranean formation.

Particulates for use in the presently described treatment fluids and methods may comprise any material used in subterranean operations, including but not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Exemplary composite particulates may comprise a binder and a filler material wherein the filler materials include silica, alumina, fumed carbon, carbon black, graphite, mica, titanium dioxide, calcium silicate, kaolin, talc, zirconia, boron, fly ash, hollow glass microspheres, solid glass, and combinations thereof.

The additional particulates described here are not limited to a particular shape. All shapes of materials, including substantially spherical materials, fibrous materials, polygonal materials (such as cubic materials), and mixtures thereof can be used according to the application. For example, fibrous materials may or may not be used to bear the pressure of a closed fracture during a fracturing operation, but could be included in the fluid loss control operations. In some embodiments, the particulates may be coated with any suitable resin or tackifying agent known to those of ordinary skill in the art.

The mean particulate size for these additional particulates may range from about 2 mesh to about 400 mesh on the U.S. Sieve Series Scale. However, in certain circumstances, other mean particulate sizes may be desired and will be entirely suitable for practice of the presently described methods. In some embodiments, the mean particulate size distribution ranges are one or more of 6/12, 8/16, 12/20, 16/30, 20/40, 30/50, 40/60, 40/70, 50/70, or 70/140 mesh, or down to smaller sizes of 200 mesh and 10's of microns. The additional particulates may be present in the treatment fluids in an amount in the range of from about 0.5 pounds per gallon ("ppg") to about 30 ppg by volume of the treatment fluid.

pH Control.

A pH control additive may be necessary to maintain the pH of the treatment fluid at a desired level to improve the effectiveness of certain breakers or crosslinkers, etc. Examples of pH control additives that may optionally be added to the treatment fluids of the present disclosure are bases and/or acid compositions. One of ordinary skill in the art will be able to select a pH for a particular application.

Surfactants.

In some embodiments, the treatment fluids of the present disclosure may include optional surfactants to improve the compatibility of the treatment fluids with other fluids (like any formation fluids) that may be present in the wellbore. One of ordinary skill in the art will be able to identify the type of surfactant as well as the appropriate concentration of surfactant to be used.

Surfactants may be used in a liquid or powder form. Where used, the surfactants may be present in the treatment fluid in an amount sufficient to prevent incompatibility with formation fluids, other treatment fluids, or wellbore fluids. In an embodiment where liquid surfactants are used, the surfactants are present in an amount in the range of from about 0.01% to about 5.0% by volume of the treatment fluid. In other embodiments, the liquid surfactants are present in an amount in the range of from about 0.1% to about 2.0% by volume of the treatment fluid. In other embodiments, the liquid surfactants are present in an amount in the range of from great than 0 to about 10 gallons pptg of the carrier fluid, or about 2 to about 7 gallons pptg of the carrier fluid or 1 gallon pptg of the carrier fluid. In embodiments where powdered surfactants are used, the surfactants may be present in an amount in the range of from about 0.001% to about 0.5% by weight of the treatment fluid.

In those embodiments where it is desirable to foam the treatment fluids of the present disclosure, surfactants such as HY-CLEAN (HC-2) surface-active suspending agent or AQF-2 additive, both commercially available from Halliburton Energy Services, Inc., of Duncan, Okla., may be used. Additional examples of foaming agents that may be used to foam and stabilize the treatment fluids include, but are not limited to, betaines, amine oxides, methyl ester sulfonates, alkylamidobetaines such as cocoamidopropyl betaine, alpha-olefin sulfonate, trimethyltallowammonium chloride, C8 to C22 alkylethoxylate sulfate and trimethylcocoammonium chloride. Other foaming agents and foam stabilizing agents may be included as well, which will be known to those skilled in the art.

Breakers.

In some embodiments of the present disclosure, the treatment fluids may comprise breakers.

Examples of breakers for use in the described treatment fluids include, but are not limited to, sodium chlorites, hypochlorites, perborate, persulfates, and peroxides (including organic peroxides). Other breakers include, but are not limited to, acids and peroxide breakers, delinkers, as well as enzymes that may be effective in breaking viscosified treatment fluids. In some embodiments, the breaker may be citric acid, tetrasodium EDTA, ammonium persulfate, or cellulose enzymes.

A breaker may be included in an amount and form sufficient to achieve the desired viscosity reduction at a desired time. The breaker may be formulated to provide a delayed break or may be encapsulated. Encapsulation methods are known by those skilled in the art, and exemplary encapsulation methods involve coating the selected breaker in a porous material that allows for release of the breaker at a controlled rate, or coating the chosen breakers with a material that will degrade when downhole so as to release the breaker when desired. Resins that may be useful in the present compositions include, but are not limited to, polymeric materials that will degrade when downhole.

Alternatively, the breakers may be encapsulated by synthetic and natural waxes. Waxes having different melting points may be used in order to control the delay of breaking based on the temperature of a specific subterranean operation. The encapsulation of the breaker is performed by mixing the breaker and wax above the melting temperature for the specific wax and then extruding the composition to form small particles of the encapsulated material. The resulting product may be annealed by briefly heating the product to the point of the coating to seal cracks in the coating, thus preventing premature release. The encapsulation may also be achieved by melt spraying the wax on the breaker (for example, citric acid) particles or by any other technique known by one of ordinary skill in the art. If used, a breaker should be included in the disclosed treatment fluid in an amount sufficient to facilitate the desired reduction in viscosity in a treatment fluid. For instance, peroxide concentrations that may be used vary from about 0.1 to about 30 gallons of peroxide per 1000 gallons of the treatment fluid. Similarly, for instance, when citric acid is used as a breaker, concentrations of from 0.11 pptg to 30 pptg are appropriate.

An optional activator or retarder to can be used to, among other things, optimize the break rate provided by a breaker. Any known activator or retarder that is compatible with the selected breaker can be used in the present treatment fluids. Examples of activators include, but are not limited to, acid generating materials, chelated iron, copper, cobalt, and reducing sugars. Examples of retarders include sodium thiosulfate, methanol, and diethylenetriamine. One of ordinary skill will be able to identify an activator or retarder for use with the selected breaker, and the proper concentration of such activator or retarder for a given application.

In some embodiments, the retarder or activator may be used in a range of from about 1 to about 100 pptg of carrier fluid or from about 5 to about 20 pptg.

One of ordinary skill will be able to identify an activator or retarder for use with the selected breaker, and the proper concentration of such activator or retarder for a given application.

Fluid Loss Control Additives.

In some embodiments of the presently described treatment fluids, additional fluid loss control additives may be combined with langbeinite material particulates described herein. Examples of such additional fluid loss control agents include, but are not limited to, starches (such as IN-DRIL® HT Plus, commercially available from Halliburton Energy Services, Inc. of Duncan, Okla.), polylactic acid, polyglycolic acid, other aliphatic esters, silica flour, gas bubbles (energized fluid or foam), benzoic acid, soaps, resin particulates, relative permeability modifiers, and other immiscible fluids. If included, the additional fluid loss additive may be included in an amount of about 5 to about 2000 pptg of the treatment fluid.

In some embodiments, the additional fluid loss additive may comprise up to about 75% of the total amount of fluid loss additive present. Alternatively, the particulate langbeinite material may comprise the largest particles of the particle size distribution utilize as the fluid loss additive. For some liquid additives that function as fluid loss additives, these may be included in an amount from about 0.01% to about 20% by volume; in some embodiments, these may be included in an amount from about 1.0% to about 10% by volume.

Starch may be used in the treatment fluid as a fluid loss control agent, but may also increase the viscosity of the carrier fluid if present in a large enough amount. As such, starch may be present in the fluid at 10 wt % to 0.1 wt % of the treatment fluid, or 1 to 10 lbs.

In other embodiments, it may be desirable to use the langbeinite material particulates without using a large amount of another fluid loss control additive. That is, to have at least about 75% to about 100% of the fluid loss reduction be due to the use of the langbeinite rather than to the use of an additional fluid loss control additive. In some embodiments, the treatment fluid described herein is substantially free of fluid loss control material other than the langbeinite material particulates.

Corrosion Inhibitors.

In some embodiments of the presently described treatment fluids, corrosion inhibitors may be combined with particulate langbeinite material. Corrosion inhibitors are mixed with the treatment fluid to protect the metal components the fluid is likely to contact. It is especially useful in acid treatments to protect iron and steel components in the wellbore and treating equipment from the corrosive treating fluid.

Corrosion inhibitor activators, such as quaternary ammonium compounds, are frequently added to activate the corrosion inhibitors components. Examples of corrosion inhibitor activators which can be utilized in accordance with the present treatment fluids include, but are not limited to, copper compounds such as cuprous iodide and cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid; and combinations thereof. When a corrosion inhibitor activator is included in the treatment fluid, it can be present in the range of from about 0.1 wt % to about 5.0 wt % of the treatment fluid.

Friction Reducers.

In some embodiments of the presently described treatment fluids, friction reducers may be combined with the particulate langbeinite material. Friction reducers aid to increase pumping efficiency during hydraulic fracturing. The addition of friction reducers to the treatment fluids allows fracturing fluids and the langbeinite material to be pumped to the target zone at a higher rate and reduced pressure than fluids without friction reducers. Examples of such friction reducers include, but are not limited to, polyacrylamide derivatives and copolymers, which are added at low concentrations. In some embodiments, the friction reducer may comprise about 0.1% to about 1% of the treatment fluid or about 1 gallon pptg of the treatment fluid.

Because of the particulate langbeinite material's ability to be combined with a variety of known oil and gas treatment fluid additives without adverse effects to the langbeinite's physical blocking abilities, the particulate langbeinite material can be used in a variety of applications. Its versatility will allow particulate langbeinite material to be used for many different operations, including stimulation, fluid loss control, diversion, and plugging operations.

The following description demonstrates various embodiments of exemplary treatment fluids, and is intended to be illustrative, and not unduly limit the scope of the appended claims. Those of skill in the art should appreciate that many changes can be made in the specific embodiments which are disclosed and still obtain a like or similar result without departing from the spirit and scope of the disclosure herein. In no way should the following be read to limit, or to define, the scope of the appended claims.

One embodiment of the present composition is a treatment fluid for fluid loss control in a high permeability formation (>50 mD) that is undergoing perforation operations. Once perforations are created between the wellbore and the formation, there is a need to control fluid loss to the formation when tripping the perforating gun assembly out of the wellbore and running a gravel pack screen assembly into the wellbore. One method of controlling fluid loss is to physical block the opening through which the fluid is migrating into using a particulate material. A treatment fluid composition comprising brine, xanthan, starch and particulate langbeinite material that is sized to physically block these openings can be prepared and injected into the reservoir before pulling tripping out the perforating gun assembly. The starch and xanthan increase the viscosity of the brine carrier fluid, allowing the particulate langbeinite material to be carried to the openings where it will be screen out of the carrier fluid. Alternatively, the treatment fluid composition can comprise about 1 bbl of brine, 0.7 lbs of xanthan, 7 lbs of starch, and about 10 to 100 lbs of particulate langbeinite material with a range of particle size of about 5 to about 50 microns. Alternatively, the treatment fluid composition can comprise about 1 bbl of brine, 0.7 lbs of xanthan, 7 lbs of starch, and about 40 lbs of particulate langbeinite material with a range of particle size of about 5 to about 50 microns.

Another embodiment of the present composition can be a treatment fluid for fracturing moderately high permeability formations (10 to 25 mD). When fracturing moderately high permeability formations, considerable amounts of the fracturing base fluid can leak off into the walls of the fracture. This loss of base fluid affects the ability to place the fracturing operation as planned. A treatment fluid composition comprising the fracturing base fluid, a guar polymer with a crosslinker, a surfactant and particulate langbeinite material can be prepared and injected into the reservoir to block fluid loss. As above, the guar/crosslinker increases the viscosity of the base fluid, allowing the particulate langbeinite material to be carried to the wall of the fracture, where it will be screened out of the base fluid. Alternatively, the treatment fluid composition can comprise about 1000 gallons of fracturing base fluid, and 30 lbs of a guar polymer with a crosslinker, 1 gallon of surfactant, and about 10 to 200 lbs of particulate langbeinite material with a particle size of 15 microns per 1000 gallons of the fracturing base fluid. In yet another alternative, the treatment fluid composition can comprise about 1000 gallons of fracturing base fluid, and 30 lbs of a guar polymer with a crosslinker, 1 gallon of surfactant, and about 50 lbs of particulate langbeinite material with a particle size of 15 microns per 1000 gallons of the fracturing base fluid.

Another embodiment of the present composition can be a treatment fluid for diverting fracturing treatments in a shale formation in long horizontal wells. When fracturing shale formations, hydraulic fracturing occurs in multiple stages to improve surface area contact with the formation. To achieve the multiple stages, the fracturing treatment is placed in the formation, which is then sealed off by injecting treatment fluids with diverters. This allows for additional injections of fracturing treatment to be pumped into the formation to the next stage. A treatment fluid for diverting fracturing treatments comprising the fracturing base fluid, a friction reducer, and particulate langbeinite material can be prepared and injected into the reservoir to seal off a stage of the fracturing operation. Alternatively, the treatment fluid composition can comprise about 1000 gallons of fracturing base fluid, and 1 gallon of a friction reducer and 100 lbs of langbeinite material per 1000 gallons of the fracturing base fluid. In yet another alternative, the treatment fluid composition can have 100 lbs of particulate langbeinite material per 100 gallons, wherein the particulate langbeinite material has about 20 lbs of particle sizes of 6/8 mesh on the U.S. Sieve Series Scale and 80 lbs of particles over the range of 16 to 400 mesh on the U.S. Sieve Series Scale. Alternatively, the treatment fluid composition can have 100 lbs of particulate langbeinite material per 100 gallons, wherein the particulate langbeinite material has about 5 to 45 lbs of particle sizes of 6/8 mesh on the U.S. Sieve Series Scale and about 55 to 95 lbs of particles over the range of 16 to 400 mesh on the U.S. Sieve Series Scale.

Another embodiment of the present compositions can be a treatment fluid for diverting an acid treatment in a naturally fractured formation. In some embodiments, continuously diverting the acid is needed to obtain better coverage across the production interval. As such, a treatment can comprise an acidic carrier fluid, a corrosion inhibitor, a surfactant, and particulate langbeinite material. The particulate langbeinite material blocks the fractures, allowing the remaining acidic treatment fluid to contact more surfaces of the wellbore. Alternatively, the treatment fluid can comprise about 1000 gallons of a 15% acidic carrier fluid, 0.5% of a corrosion inhibitor by weight of the acidic carrier fluid, 1 gallon of surfactant, and about 20 to 500 lbs of langbeinite material per 1000 gallons of the acidic carrier fluid. In yet another alternative, the treatment fluid can comprise about 1000 gallons of a 15% acidic carrier fluid, 0.5% of a corrosion inhibitor by weight of acidic fluid, 1 gallon of surfactant, and about 150 lbs of langbeinite material per 1000 gallons of the acidic fluid.

Another embodiment of the present composition can be a treatment fluid for cleaning out asphaltene build up in a moderate permeability formation (~10 mD). A treatment fluid composition comprising a xylene carrier fluid and particulate langbeinite material can be prepared and injected into the reservoir to remove the asphaltene. Alternatively, the treatment fluid can comprise 1000 gallons of the xylene carrier fluid, and about 10 to 500 lbs of langbeinite with a particle size range of 5 to 25 micron or about 150 lbs of langbeinite with a particle size range of 5 to 25 micron.

The following examples are included to demonstrate the ability of a langbeinite material to be used as a physical barrier in low temperature wells, and under acidic conditions. In these examples, particulate langbeinite ($K_2Mg_2(SO_4)_3$) was chosen as the particulate langbeinite material.

Example 1

The degradation of langbeinite in a pH neutral solution was measured as a function of time. For this example, a series of langbeinite/water solutions were heated at set temperatures, with the un-degraded langbeinite being weighed after various periods of time to determine the degradation rate.

Figure 4:
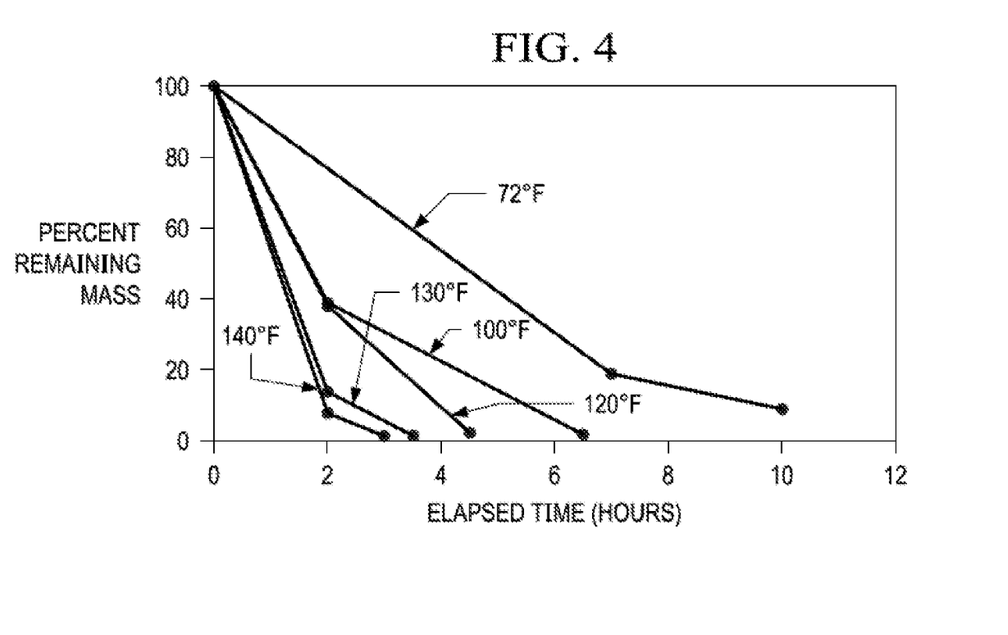
FIG. 4. Degradation of langbeinite versus time in a pH neutral solution.

Each solution had 1 gram of particulate langbeinite placed in 8 oz jars with 100 mL of water. The langbeinite had a particle size of 12/14 mesh on the U.S. Sieve Series Scale. The jars were sealed and placed in a temperature controlled oven. The oven was operated at 72° F. (~22° C.), 100° F. (~38° C.), 120° F. (~49° C.), 130° F. (~54° C.), and 140° F. (~60° C.). At predetermined times, a sealed jar was removed from the oven, wherein the particulate langbeinite solids remaining in the jar were filtered, dried and weighed to determine the weight change over time. The results are shown in FIG. 4.

The degradation rate of the langbeinite was temperature dependent, with the highest oven temperatures having the fastest degradation rate. However, even at 140° F. (~60° C.), the langbeinite did not fully degrade until about 3 hours. At 72° F. (~22° C.), the degradation time was extended to about greater than 10 hours.

The results were curve fitted to allow for predictions. It was found that Equation 1 described all five curves and can be used to predict a degree of degradation for a given temperature in ° F. (T) and time in hours (t).

$$\% \text{ Degradation} = 100 * e^{(-t*(0.000004867T^3 - 0.001338859T^2 + 0.130546917T - 4.027318772))} \quad \text{EQUATION 1:}$$

Based on these results, an operator can control the blocking of porous portions of a reservoir using particulate langbeinite material for pre-determined amounts of time at known temperatures.

Example 2

The degradation of langbeinite in an acidic solution was measured as a function of time and compared to a pH neutral solution of water and langbeinite. For this example, a series of solutions of particulate langbeinite with water or 15% HCl were heated at set temperatures, with the langbeinite being weighed after various periods of time to determine the degradation rate.

Figure 5:
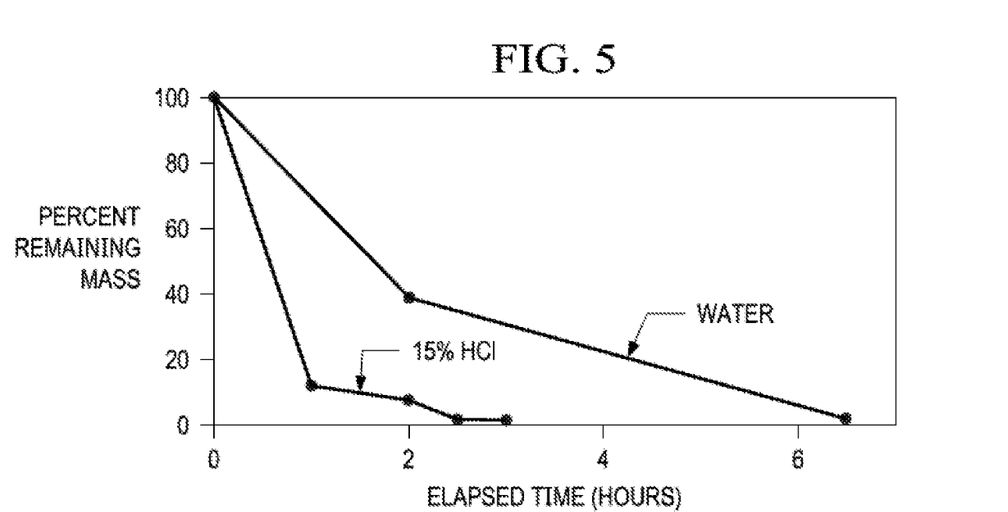
FIG. 5. Comparison of the degradation of langbeinite versus time in a pH neutral solution and an acidic solution.

For each acidic solution, 1 gram of langbeinite was placed in an 8 oz jar, with a 15% HCl solution (85 mL of a water and 15 mL of HCl). As before, the neutral pH solution had 1 gram of particulate langbeinite placed in an 8 oz jar with 100 mL of water. The langbeinite had a particle size of 12/14 mesh on the U.S. Sieve Series. The jars were sealed and placed in a temperature-controlled oven operating at a temperature of 100° F. (~38° C.). At various periods of time, a sealed jar was removed from the oven, wherein the solids remaining in the jar were filtered, dried and weighed to determine the weight change over time. The results are shown in FIG. 5.

The degradation rate of the langbeinite increased with acid. In a pH neutral solution, the langbeinite lasted for about 6.5 hours before fully degrading; whereas, in a 15% HCl solution, the langbeinite did not fully degrade (about 3% remaining mass within about 3 hours). As such, FIG. 5 shows that the langbeinite has some finite lifetime in a 15% HCl solution and could be used for diverting acid. This figure also shows that the degradation rate is faster in a 15% HCl solution. Thus, acidic fluids can be injected into the reservoir to increase the degradation rate of the langbeinite, removing it in a shortened amount of time. Such a fast degradation would be needed for methods such as those using non-acidic stimulation treatments.

The results of Example 2 show that at 100° F. (~38° C.), or below, the service life of the langbeinite is long enough to allow placing it in HCl and having enough time to pump it into place down hole (about 15 to 30 minutes, depending on tubular size). Thus, an operator can controllably block porous portions of a reservoir using particulate langbeinite for pre-determined amounts of time during acid stimulation of reservoirs.

Example 3

The degradation of langbeinite in solutions with different salinities were measured as a function of time and compared to pH neutral control solutions of fresh water and langbeinite. For this example, a series of solutions of particulate langbeinite in fresh water with no added NaCl, a 5% NaCl salt water (5 g of NaCl in about 100 mL of water), a 10% NaCl salt water (10 g of NaCl in about 100 mL of water), and seawater were heated at set temperatures, with the langbeinite being weighed after various periods of time to determine the degradation rate.

Figure 6:
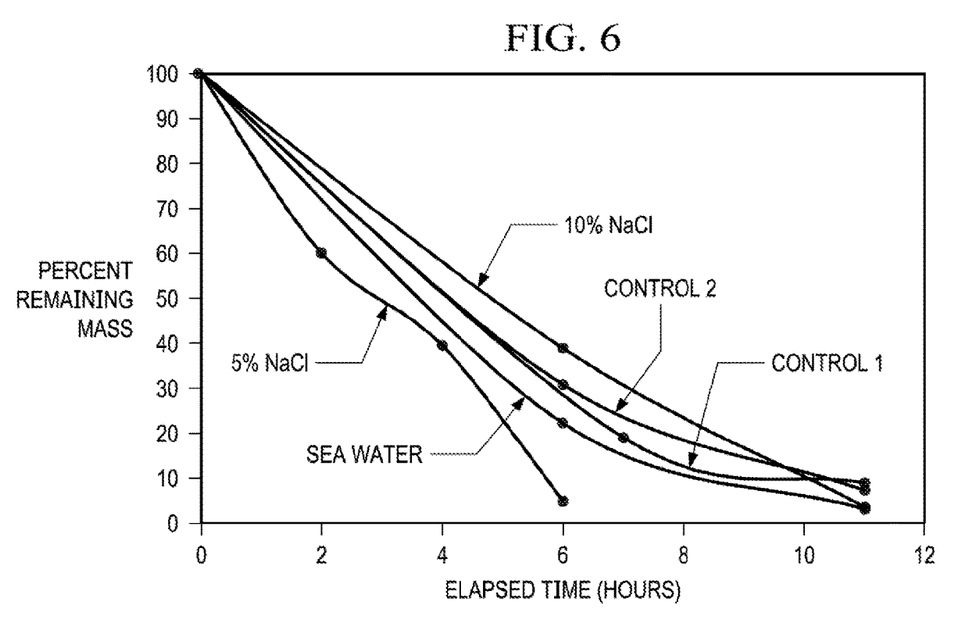
FIG. 6. Comparison of the degradation of langbeinite versus time in pH neutral fresh water controls, 5% NaCl salt water, 10% NaCl salt water and sea water.

For each salt water solution and seawater, 1 gram of langbeinite was placed in an 8 oz jar with 100 mL of the salt water or seawater. As before, the neutral pH control solutions had 1 gram of particulate langbeinite placed in an 8 oz jar with 100 mL of water. The langbeinite had a particle size of 12/14 mesh on the U.S. Sieve Series Scale. The jars were sealed and placed in a temperature-controlled oven. The oven was operated at 100° F. (~38° C.). At predetermined times, the sealed jars were removed from the oven, wherein the particulate langbeinite solids remaining in the jar were filtered, dried and weighed to determine the weight change over time. The results are shown in FIG. 6.

The 10% NaCl salt water had the least degradation of all of the saline solutions during the time period being tested. The degradation rate of the langbeinite increased with the 5% NaCl salt water, with smaller increases in degradation rate being observed with the seawater. After 6 hours, the langbeinite in the 5% NaCl salt water was almost fully degraded (about 5% remaining) whereas about 40% of the langbeinite in the 10% NaCl salt water remained. Likewise, the seawater had about 22% of langbeinite remaining. After 11 hours, the degradation of langbeinite in both the 10% NaCl salt water and the seawater was about the same, with about 3.5% of langbeinite remaining. No langbeinite residual was observed in the 5% NaCl salt water at 11 hours. As such, FIG. 6 shows that the salinity of the treatment solution can be selected to control the blocking of porous portions of a reservoir using particulate langbeinite material for shorter (<6 hours) amounts of time.

The above examples show that langbeinite can slowly dissolve at temperatures below 140° F. in 3 to 10 hours. This dissolution rate can be maintained with the use of water or saline solutions, including salt water and seawater. Alternatively, acidic solutions can be used to increase the degradation rate for a controllable temporary physical barrier. Thus, the present compositions will be capable of blocking openings for temporary periods of time without the risk of permanent blockage often seen in low temperature reservoirs. This allows the compositions to be used for a variety of operations downhole, including fluid loss control, diversion, and plugging operations.

What is claimed is:

1. A method of plugging an opening in a subterranean formation comprising:
   a) injecting a treatment fluid comprising a carrier fluid and a particulate langbeinite material into a subterranean formation;
   b) blocking at least one opening in said subterranean formation with the particulate langbeinite material, wherein the langbeinite material has a particle size from 4 mesh to 150 mesh on the U.S. Sieve Series scale; and
   c) allowing the particulate langbeinite material to degrade; and,
   d) flowing a fluid through the at least one opening.

2. The method of claim 1, wherein said particulate langbeinite material is selectively degraded by injecting an acid treatment fluid into the subterranean formation.

3. The method of claim 1, wherein said opening is an annulus, casing, tubing, screens, slots, ports, a void space within a sand or proppant pack, perforations, washouts, hole, an opening in a downhole tool, a parting in the casing or tubing, a natural fracture, vug, wormhole, pore throat, induced fracture, formation face, or a combination thereof.

4. The method of claim 1, wherein said degrading takes between about 3 to about 14 hours.

5. The method of claim 1, wherein the bottom hole temperature of the wellbore is between 75° F. (−23° C.) and 140° F. (−60° C.).

6. The method of claim 1, wherein the particle size of said particulate langbeinite material is from 12-14 mesh on the U.S. Sieve Series scale or from about 5 to about 50 microns.

7. The method of claim 1, further comprising injecting a hydrochloric acid solution and soaking the particulate langbeinite material in said hydrochloric acid solution until the particulate langbeinite material degrades completely.

8. The method of claim 1, wherein said particulate langbeinite material is present in an amount between about 50 pounds per thousand gallons (pptg) of the carrier fluid and about 400 pptg of the carrier fluid.

9. The method of claim 1, further comprising at least one additive selected from a group comprising salts, viscosifying agents, pH control additives, surfactants, breakers, biocides, crosslinkers, additional fluid loss control agents, stabilizers, chelating agents, scale inhibitors, gases, mutual solvents, particulates, corrosion inhibitors, oxidizers, reducers, friction reducer, and any combination thereof.

10. The method of claim 1, further comprising alternating injections of an acid treatment fluid with injections of said treatment fluid.

11. The method of claim 1, wherein the opening is a porous section of said subterranean formation, wherein the treatment fluid is injected at fracturing pressures to fracture the subterranean formation and the particulate langbeinite material blocks the porous section to stop fluid loss in the porous section.

12. A method of plugging a conduit, comprising
   a) injecting a plug molded from a composition comprising a particulate langbeinite material into a subterranean formation, wherein the langbeinite material has a particle size from 4 mesh to 150 mesh on the U.S. Sieve Series scale;
   b) blocking a passage in said subterranean formation with the plug;
   c) allowing the particulate langbeinite material in the plug to degrade; and,
   d) flowing a fluid or downhole tool through the passage.

13. The method of claim 12, further comprising injecting an acidic fluid to selectively degrade the particulate langbeinite material.

* * * * *

UNITED STATES PATENT AND TRADEMARK OFFICE
CERTIFICATE OF CORRECTION

| | |
|---|---|
| PATENT NO. | : 11,326,088 B2 |
| APPLICATION NO. | : 16/886377 |
| DATED | : May 10, 2022 |
| INVENTOR(S) | : Todd |

It is certified that error appears in the above-identified patent and that said Letters Patent is hereby corrected as shown below:

In the Specification

In Column 6, Line 23, delete "Xis" and insert -- X is --, therefor

In Column 6, Line 29, delete "$K_2Mn_2(BeF_4)_1$" and insert -- $K_2Mn_2(BeF_4)_3$ --, therefor Signed and Sealed this
Twentieth Day of August, 2024

Katherine Kelly Vidal
*Director of the United States Patent and Trademark Office*